US008603663B2

(12) United States Patent
Park et al.

(10) Patent No.: US 8,603,663 B2
(45) Date of Patent: Dec. 10, 2013

(54) BATTERY PACK (75) Inventors: Shi-Dong Park, Yongin-si (KR); Tae-Yong Kim, Yongin-si (KR); Charles Kim, Yongin-si (KR); Hyun-Ye Lee, Yongin-si (KR)

(73) Assignees: Samsung SDI Co., Ltd., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 195 days.

(21) Appl. No.: 12/978,994

(22) Filed: Dec. 27, 2010

(65) Prior Publication Data

US 2011/0287298 A1 Nov. 24, 2011

(30) Foreign Application Priority Data

May 20, 2010 (KR) .................... 10-2010-0047648

(51) Int. Cl.
*H01M 6/46* (2006.01)

(52) U.S. Cl.
USPC ........... 429/152; 429/156; 429/158; 429/164; 429/176; 429/178

(58) Field of Classification Search
USPC ............. 429/53, 66, 156, 163, 164, 176, 152, 429/158, 178
See application file for complete search history.

(56) References Cited

U.S. PATENT DOCUMENTS

| | | | | |
|---|---|---|---|---|
| 5,510,203 A * | 4/1996 | Hamada et al. | ........... | 429/53 |
| 6,111,387 A * | 8/2000 | Kouzu et al. | ........... | 320/107 |
| 6,275,003 B1 * | 8/2001 | Marukawa et al. | ........... | 320/116 |
| 6,517,966 B1 * | 2/2003 | Marukawa et al. | ........... | 429/120 |
| 6,819,081 B2 * | 11/2004 | Izawa et al. | ........... | 320/107 |
| 7,074,517 B2 * | 7/2006 | Higashino | ........... | 429/66 |
| 7,563,137 B1 * | 7/2009 | Koetting et al. | ........... | 439/627 |
| 7,972,185 B2 * | 7/2011 | Kim | ........... | 439/754 |
| 2005/0079408 A1 | 4/2005 | Hirano | | |
| 2007/0018612 A1 | 1/2007 | Vanluvanee, Jr. | | |
| 2008/0090139 A1 | 4/2008 | Hurst et al. | | |
| 2009/0061305 A1 * | 3/2009 | Nishida et al. | ........... | 429/164 |
| 2009/0206841 A1 | 8/2009 | Weng | | |
| 2010/0141208 A1 * | 6/2010 | Deal et al. | ........... | 320/116 |

FOREIGN PATENT DOCUMENTS

| | | |
|---|---|---|
| EP | 1450422 A1 | 8/2004 |
| JP | 06-191290 A | 7/1994 |
| JP | 11-120978 A | 4/1999 |
| JP | 2006-080042 A | 3/2006 |
| JP | 2006-324350 A | 11/2006 |
| JP | 2008-251352 A | 10/2008 |

OTHER PUBLICATIONS

JP 2008-251352 (machine translation).*

(Continued)

*Primary Examiner* — Patrick Ryan
*Assistant Examiner* — Alex Usyatinsky
(74) *Attorney, Agent, or Firm* — Lee & Morse, P.C.

(57) ABSTRACT

A battery pack includes a plurality of battery modules, each battery module including a plurality of battery units with positive and negative electrode terminals, and each battery unit including a plurality of battery cells, a plurality of bus bars connecting positive electrode terminals to negative electrode terminals of adjacent battery units, battery modules adjacent to each other in a horizontal direction being electrically connected to each other via the bus bar to form a loop, and a connection member electrically connecting battery modules adjacent to each other in a vertical direction.

19 Claims, 5 Drawing Sheets

(56) References Cited

OTHER PUBLICATIONS

JP2006-324250 (machine translation).*
Korean Notice of Allowance in KR 10-2010-0047648, dated Mar. 19, 2012 (Park, et al.).
Korean Office Action in KR 10-2010-0047648, dated Jul. 19, 2011 (Park et al.).
European Search Report in EP 11165240.0-2119, dated Sep. 21, 2011 (Park, et al.).

* cited by examiner

BATTERY PACK

BACKGROUND

1. Field

Example embodiments relate to battery packs, and more particularly, to battery packs that electrically connect stacked battery modules.

2. Description of the Related Art

In general, unlike primary batteries, i.e., not chargeable batteries, secondary batteries are chargeable and dischargeable. Secondary batteries, i.e., rechargeable batteries, are used as energy sources of small-sized mobile devices, e.g., cellular phones, laptop computers, and camcorders, or medium/large-sized devices, e.g., electric vehicles, hybrid electric vehicles, electric bicycles, uninterruptible power supplies (UPS), etc. For example, a secondary battery may be a lithium secondary battery.

Small-sized mobile devices may include several battery cells. On the other hand, medium/large-sized devices, e.g., electric vehicles, hybrid electric vehicle, electric bicycles, and UPS, may require a battery having a high power output and a large capacitance. Thus, medium/large-sized devices may require a battery pack with a plurality of battery cells that are electrically connected to one another.

In general, the plurality of battery cells in a battery pack may be connected in series and/or in parallel and may be mounted in a battery unit. A plurality of battery units may be connected to one another via a connection member, e.g., a bus bar, to form a battery module. A plurality of battery modules may be connected to one another to form a battery pack to provide a higher power output and a larger capacity. When assembling a battery pack by using a plurality of battery modules, the plurality of battery modules need to be firmly connected to one another so as to form a stable battery pack.

SUMMARY

Embodiments are therefore directed to battery packs, which substantially overcome one or more of the problems due to the limitations and disadvantages of the related art.

It is therefore a feature of an embodiment to provide battery packs with a plurality of stacked battery modules that are electrically connected to each other via a connection member.

At least one of the above and other features and advantages may be realized by providing a battery pack, including a plurality of battery modules, each battery module including a plurality of battery units with positive and negative electrode terminals, and each battery unit including a plurality of battery cells, a plurality of bus bars connecting positive electrode terminals to negative electrode terminals of adjacent battery units, battery modules adjacent to each other in a horizontal direction being electrically connected to each other via the bus bar to form a loop, and a connection member electrically connecting battery modules adjacent to each other in a vertical direction.

The connection member may include a block portion covering at least one battery unit in each horizontal layer of battery modules, each horizontal layer of battery modules including battery modules adjacent to each other along the horizontal direction, and a connection end disposed on the block portion and coupled to an electrode terminal of the at least one battery unit, the connection end electrically connecting a first electrode terminal of the at least one battery unit in a first horizontal layer of battery modules to a second electrode terminal of the at least one battery unit in a second horizontal layer of battery modules vertically adjacent to the first horizontal layer of battery modules, the first and second electrode terminals having different polarities.

The battery pack may further include a mounting portion on the block portion, the connection end being mounted on the mounting portion, and the block portion including a first portion covering an upper surface of the at least one battery unit and a second portion extending to a side surface of the at least one battery unit from the first portion.

The block portion may include a polymer resin.

The connection end may include a plurality of connection bars electrically connected to electrode terminals of the battery units, a first end of each of the connection bars being connected to a first electrode terminal of least one battery unit in a first battery module, and a plurality of wires electrically connected to the connection bars, each wire including a first terminal ring electrically connected to a second end of a respective connection bar, and a second terminal ring electrically connected to a second electrode terminal of at least one battery unit in a second battery module vertically adjacent to the first battery module.

The connection bars may extend from an upper surface of the at least one battery unit in the first battery module toward the second battery module along a side surface of the at least one battery unit in the first battery module.

A first electrode terminal of at least one battery unit in a vertically uppermost battery module may be connected to a first wire via a first connection bar to define a first output terminal, and a second electrode terminal of at least one battery unit in a vertically lowermost battery module may be connected to a second wire via a second connection bar to define a second output terminal, the first and second electrode terminals having different polarities.

The battery pack may further include a coupling portion on a portion of the second end of the connection bar, the first terminal ring of the wire being coupled to the coupling portion.

The connection end may include a connection bar electrically connected to an electrode terminal of the at least one battery unit, the connection bar extending from an upper surface of the at least one battery unit of a battery module toward a vertically adjacent battery module along a side surface of the at least one battery unit.

A first end of the connection bar may be coupled to a first electrode terminal of at least one battery unit of a first battery module, and a second end of the connection bar may be coupled to a second electrode terminal of at least one battery unit of a second battery module vertically adjacent to the first battery module.

First and second electrode terminals of the battery units of the battery modules may be vertically arranged in same positions across different layers, and the connection end may connect the first electrode terminal of at least one battery unit of the battery modules arranged in a first layer and the second electrode terminal of at least one battery unit of the battery modules arranged in a second layer, in a diagonal direction.

The connection member may be connected to at least one battery unit in each layer of the battery modules, each layer of the battery modules including a plurality of battery modules adjacent to each other along the horizontal direction.

The connection member may be disposed in a gap between battery modules arranged in a first layer and battery modules arranged in a second layer adjacent to the first layer along the vertical direction, each of the first and second layers including a plurality of battery modules adjacent to each other along the horizontal direction.

The battery unit may include a case configured to provide space for the battery cells, the positive and negative electrode terminals being connected to the battery cells and protruding out of the case.

The battery pack may further include a pair of end plates on outermost portions of each battery module, the pair of end plates being coupled to each other via a guide plate.

The battery pack may further include a coupling hole in each of the end plates, end plates of battery modules adjacent to each other along the vertical direction being coupled to each other via a fastener through the coupling hole.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0047648, filed on May 20, 2010, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
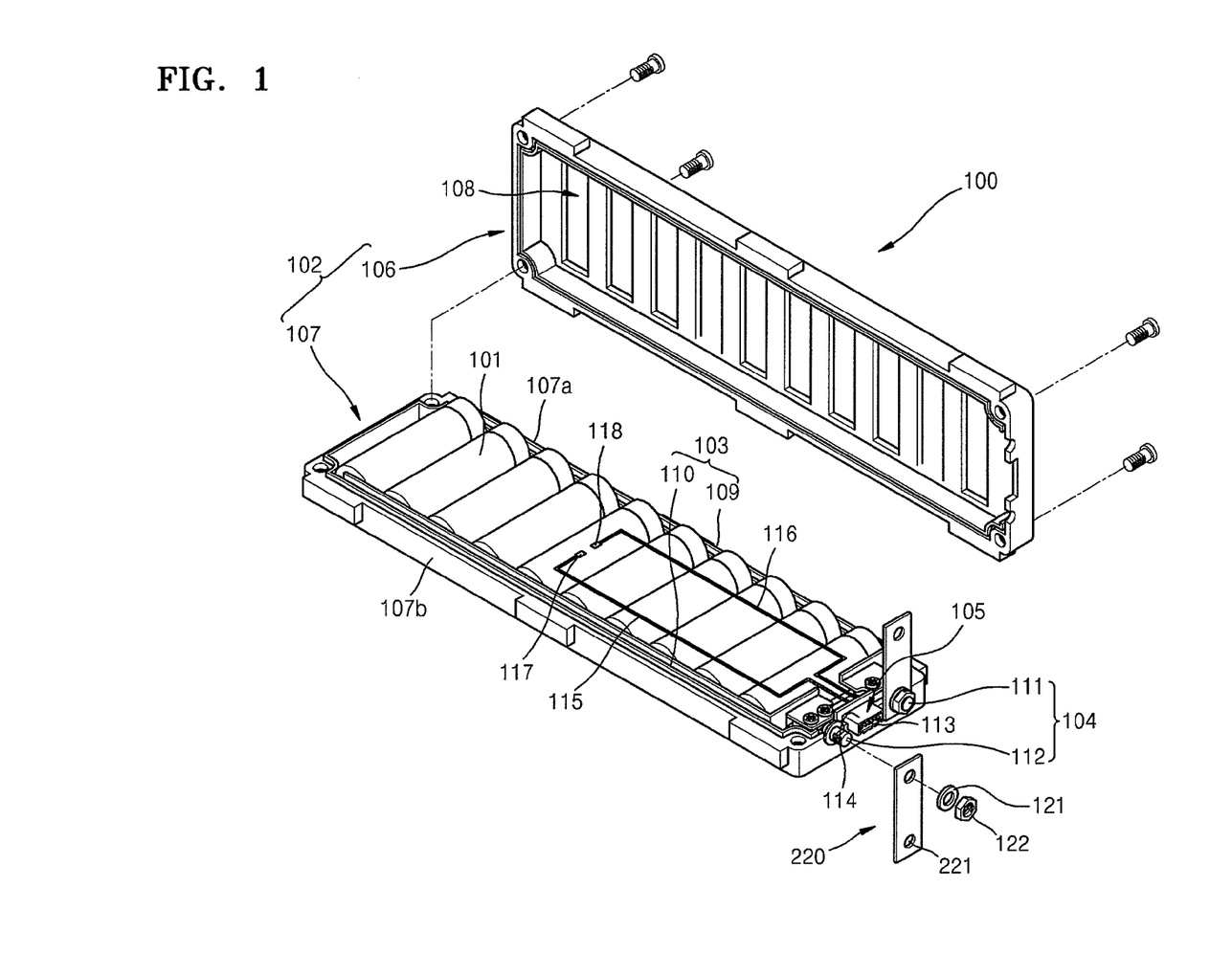
FIG. 1 illustrates an exploded perspective view of a battery unit according to an embodiment.

FIG. 1 illustrates a perspective view of a battery unit 100 according to an embodiment. Referring to FIG. 1, the battery unit 100 may include a case 102 in which a plurality of battery cells 101 are accommodated, an electrode tab 103 that electrically connects the plurality of battery cells 101, a plurality of electrode terminals 104 that are electrically connected to the electrode tab 103 and protrude out of the case 102, and a communication connector 105 that transmits an electrical signal for measuring a temperature or a charging state of the battery cells 101.

The plurality of battery cells 101 are serially disposed and electrically connected to one another in order for the battery unit 100 to have a high power output and a large capacity. The battery cells 101 may each be, for example, a cylindrical secondary battery, a prismatic secondary battery, or a polymer secondary battery.

The case 102 may include an upper case 106 and a lower case 107 that is coupled to the upper case 106. When the upper case 106 and the lower case 107 are combined, the upper case 106 and the lower case 107 provide an inner space for accommodating the plurality of battery cells 101. A plurality of heat dissipation holes 108 may be formed in the upper case 106 or the lower case 107 to quickly dissipate heat generated during operation of the battery cells 101 out of the case 102.

The battery cells 101 may be serially disposed in a length direction of the case 102, and may be connected to one another via the electrode tab 103. The electrode tab 103 may include a first electrode tab 109 connected to a first side of the battery cells 101 and a second electrode tab 110 connected to a second side of the battery cells 101.

The first electrode tab 109 and the second electrode tab 110 are strip-type conductive plates that may be foamed of, for example, nickel. The first electrode tab 109 and the second electrode tab 110 attached to the battery cells 101 may be electrically connected to the battery cells 101 by welding and have different polarities.

The first electrode tab 109 may be disposed on an inner surface of a first sidewall 107a in a length direction of the lower case 107. The second electrode tab 110 may be disposed on an inner surface of a second sidewall 107b facing the first sidewall 107a.

The plurality of battery cells 101 may be connected in parallel by the first electrode tab 109 and the second electrode tab 110. Alternatively, the battery cells 101 may be serially connected to each other; however, the present embodiment is not limited thereto, and the battery cells 101 may be connected to each other in a serial and/or parallel manner.

The electrode terminals 104 may be formed on one side of the case 102. The electrode terminals 104 may include a first electrode terminal 111 that is electrically connected to the first electrode tab 109, and a second electrode terminal 112 that is electrically connected to the second electrode tab 110. The first electrode terminal 111 and the second electrode terminal 112 extend out of the case 120. For example, the first electrode terminal 111 and the second electrode terminal 112 may be bolt-shaped but are not limited thereto.

The communication connector 105 may be disposed on the side of the case 102 where the first electrode terminal 111 and the second electrode terminal 112 are disposed. The communication connector 105 may be electrically connected to a plurality of thermistor lines 115 and a plurality of balancing lines 116. The communication connector 105 may transmit data regarding a state of the battery cells 101, e.g., change in the temperature and/or charging state of the battery cells 101, in a form of an electrical signal to a controller, e.g., a battery management system (BMS).

A thermistor sensor 117 that measures a temperature may be installed at an end portion of each thermistor line 115. A balancing sensor 118 that measures a charging amount in the battery unit 100 may be installed at an end portion of each balancing line 116. As long as the thermistor sensor 117 and the balancing sensor 118 are electrically connected to the plurality of battery cells 101, the positions thereof are not limited to the end portions of the thermistor lines 115 and the end portions of the balancing lines 116. The thermistor lines 115 and the balancing lines 116 are electrically connected to a plurality of connection pins 113. The connection pins 113 are installed in a connector housing unit 114. The number of connection pins 113 is not limited.

A bus bar 220 may be installed at each of the first electrode terminal 111 and the second electrode terminal 112 to electrically connect the battery unit 100 to at least one adjacent battery unit 100. The bus bar 220 is a conductive plate. An insertion hole 221 into which the first electrode terminal 111 and the second electrode terminal 112 are inserted is formed in the bus bar 220. The first electrode terminal 111 and the second electrode terminal 112 are inserted into the insertion hole 221, and while a washer 121 is inserted around each of the first electrode terminal 111 and the second electrode terminal 112, a nut 122 couples each of the first electrode terminal 111 and the second electrode terminal 112 to the bus bar 200.

Figure 2:
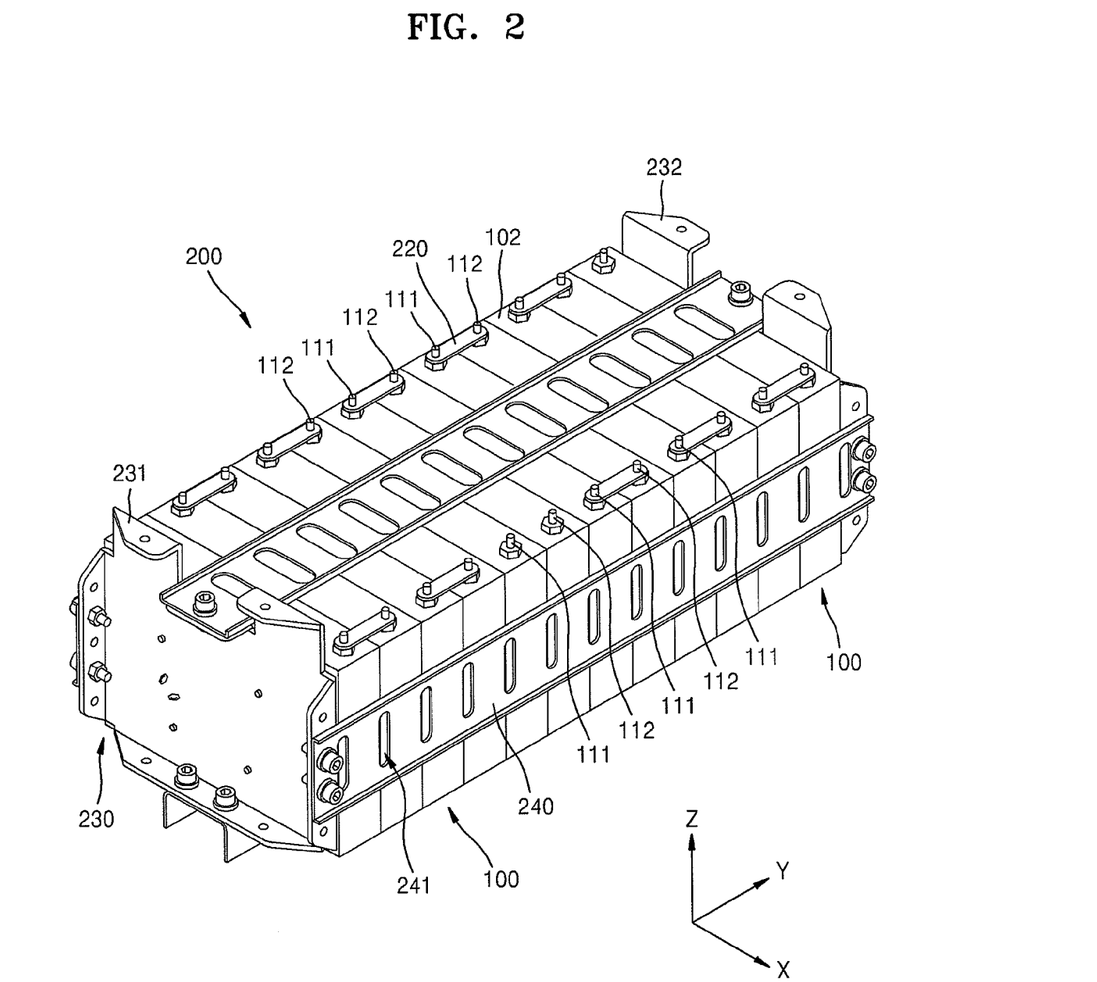
FIG. 2 illustrates a perspective view of a battery module including a plurality of the battery units of FIG. 1.

FIG. 2 illustrates a schematic view of a battery module 200 in which a plurality of the battery units 100 are stacked according to an embodiment. Referring to FIG. 2, the battery module 200 may include a plurality of the battery units 100 serially disposed in a Y-axis direction, e.g., a longitudinal side of each battery unit 100 may extend along the X-axis and the plurality of battery units 100 are adjacent to each other along the Y-axis. Alternatively, the battery module 200 may be stacked in an X-axis direction, in a Z-axis direction, or in both Z-axis and X-axis directions at the same time.

A plurality of the battery cells 101 (see FIG. 1) may be stacked in each battery unit 100. The plurality of battery cells 101 are accommodated in the case 102. The plurality of battery cells 101 are electrically connected to one another via the first electrode tab 109 (see FIG. 1) and the second electrode tab 110 (see FIG. 1), and the first electrode tab 109 and the second electrode tab 110 are electrically connected to portions of the first electrode terminal 111 and the second electrode terminal 112 that are protruded out of the case 102.

Adjacent battery units 100 are arranged in such a way that facing terminals of adjacent battery units 100 may have opposing polarities. That is, the first electrode terminal 111 of one battery unit 100 may face and be connected to the second electrode terminal 112 of the adjacent battery unit 100 via the bus bar 220. The number of battery units 100 may be determined in a designing process in consideration of required charging and discharging capacities.

A pair of end plates 230 may be installed on outermost sides of the battery module 200. The end plates 230 may include a first end plate 231 installed at a first end portion of the battery module 200 and a second end plate 232 installed at a second end portion of the battery module 200. A surface of the first end plate 231 and a surface of the second end plate 232 may be closely adhered to an outer surface of the battery units 100 on two outermost sides of the battery module 200.

The first end plate 231 and the second end plate 232 may be coupled to each other via a guide plate 240. The guide plate 240 may extend along a sidewall of the plurality of battery units 100. For example, the guide plate 240 may be a strip-type plate. A first end of the guide plate 240 may be screw-coupled to the first end plate 231, and a second end of the guide plate 240 may be screw-coupled to the second end plate 232. Accordingly, the plurality of battery units 100 may be horizontally and continuously arranged, and thus, the battery units 100 may be prevented from deviating from their original positions, i.e., from moving.

A plurality of heat dissipation holes 241 may be formed in the guide plate 240. The heat dissipation holes 241 may be arranged in a length direction of the guide plate 240 and may be spaced apart from one another. The heat dissipation holes 241 are formed in order to quickly discharge heat, e.g., generated by the battery units 100 during operation of the battery units 100, out of the battery units 100.

Figure 3:
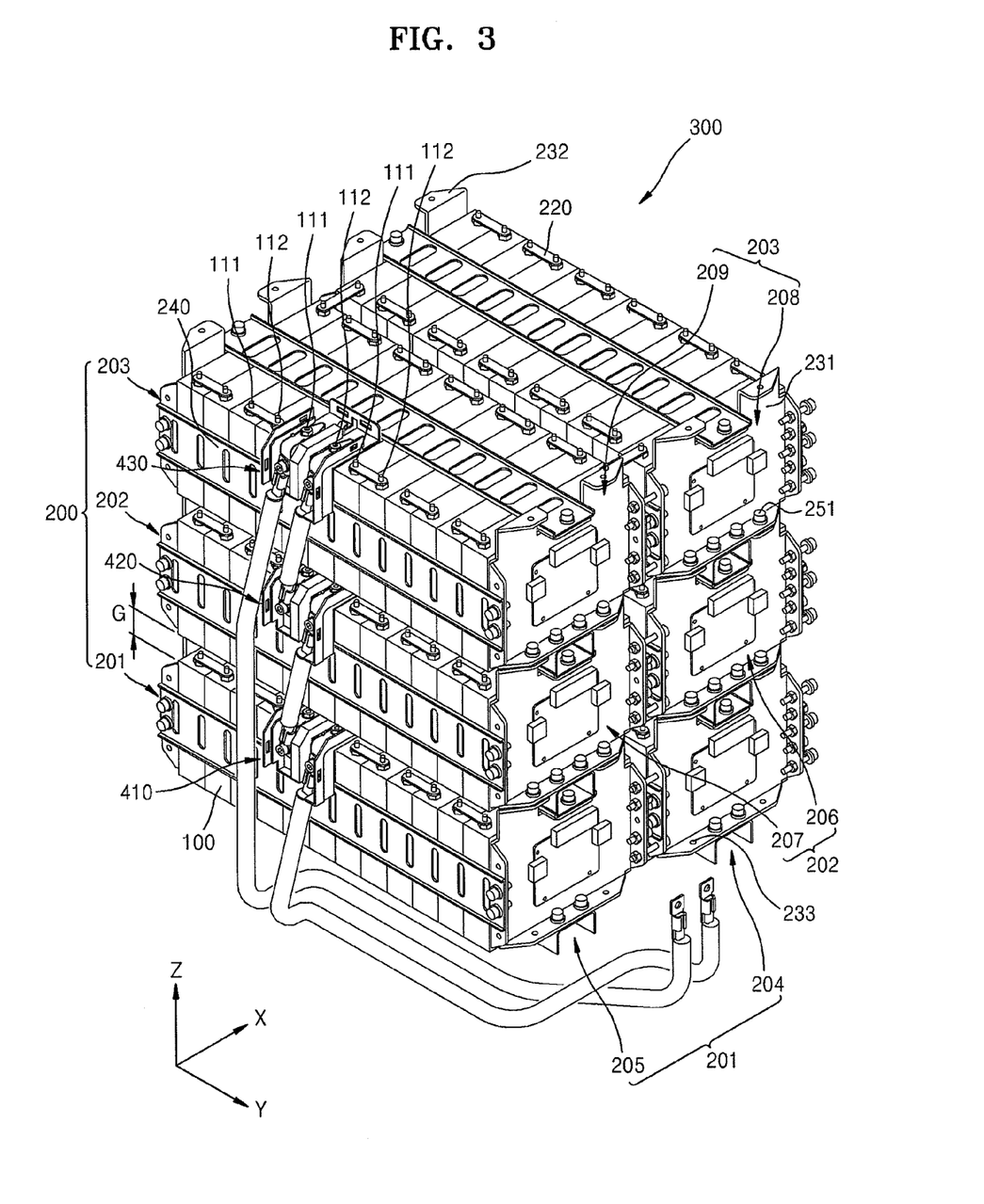
FIG. 3 illustrates a perspective view of a battery pack including a plurality of the battery modules of FIG. 2.
Figure 4:
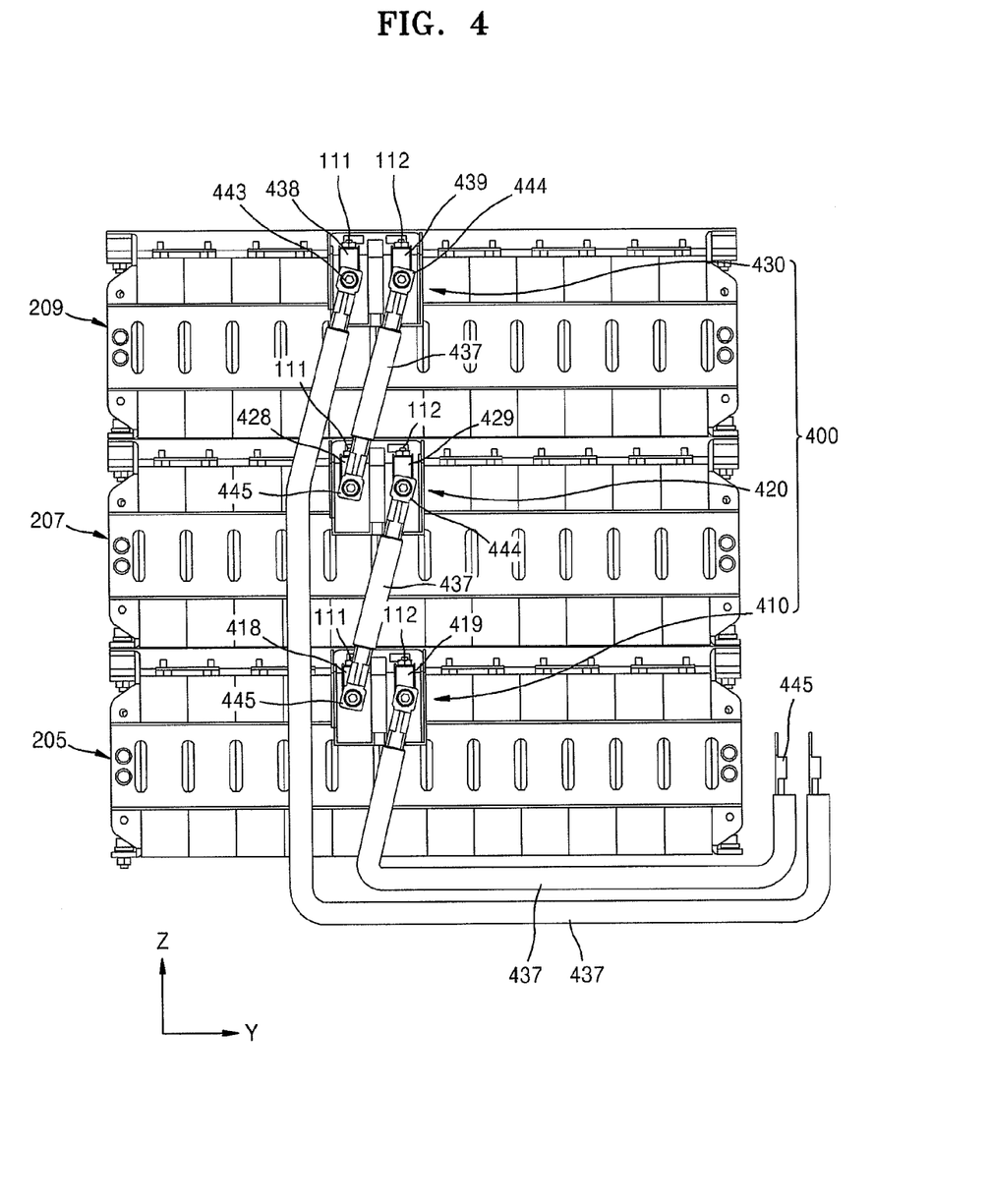
FIG. 4 illustrates a front view of the battery pack of FIG. 3.

FIG. 3 illustrates a perspective view of a battery pack 300 in which a plurality of the battery modules 200 are integrated. FIG. 4 illustrates a front view of the battery pack 300 of FIG. 3.

Referring to FIG. 3, the battery pack 300 is an assembly in which a plurality of the battery modules 200 are horizontally and vertically stacked, i.e., along the X-axis and the Z-axis. As described previously with reference to FIG. 2, the plurality of battery units 100, which are arranged adjacent to one another, may be firmly fixed together in each battery module 200 by connecting the guide plates 240 to the first end plate 231 and the second end plate 232. Further, as illustrated in FIG. 3, the battery modules 200 may be fixed to each other by attaching coupling fasteners 251 through coupling holes in the first end plates 231 and the second end plates 232. For example, as illustrated in FIG. 3, two battery modules 200 adjacent to each other along the Z-axis, e.g., a third battery module 206 and a fifth battery module 208, may be connected to each other by inserting coupling fasteners 251 through coupling holes in respective first end plates 231.

The battery modules 200 arranged in the same layer may form one electric loop via the bus bar 220. That is, battery modules 200 adjacent to each other along the X-axis may be electrically connected to each other via the bus bar 220. For example, as illustrated in FIG. 3, the fifth battery module 208 may be connected to a sixth battery module 209 via the bus bar 220 extending along the X-axis, e.g., the bus bar 220 may connected electrode terminals of battery units 100 adjacent to each other along the X-axis and adjacent to respective second end plates 232 of the fifth and sixth battery modules 208 and 209.

In detail, a first battery module group 201 including a first battery module 204 and a second battery module 205 that are adjacent to each other may be arranged in a first layer. In a second layer above the first battery module group 201, a second battery module group 202 including the third battery module 206 and a fourth battery module 207 that are adjacent to each other may be arranged. In a third layer above the second battery module group 202, a third battery module group 203 including the fifth battery module 208 and the sixth battery module 209 that are adjacent to each other may be arranged.

In the first layer, the first battery module 204 and the second battery module 205 may be electrically connected to each other via the bus bar 220, in such a way that facing terminals of adjacent battery units 100, i.e., adjacent along the X-axis, may have opposing polarities. In the second layer, the third battery module 206 and the fourth battery module 207 may be electrically connected to each other via the bus bar 220. Also, in the third layer, the fifth battery module 208 and the sixth battery module 209 may be electrically connected to each other via the bus bar 220, as described previously.

As described above, adjacent battery modules 200 in the same layer, i.e., battery modules 200 adjacent to each other in a horizontal direction along the X-axis, may form a loop. That is, the first electrode terminal 111 of one battery unit 100 in a battery module 200 may be electrically connected to the second electrode terminal 112 of another battery unit 100 in an adjacent battery module 200, i.e., along the X-axis, via the bus bar 220.

Further, as illustrated in FIG. 4, the first battery module group 201, the second battery module group 202, and the third battery module group 203 may be arranged adjacent to one another in different layers, i.e., vertically along the Z-axis, and may be electrically connected to one another via a connection member 400. To install the connection member 400, a gap may be formed between the first battery module group 201 and the second battery module group 202 and between the second battery module group 202 and the third battery module group 203. The connection member 400 will be described in more detail below with reference to FIGS. 4 and 5.

Here, the first electrode terminal 111 and the second electrode terminal 112 of one pair of adjacent battery units 100 refer to the first electrode terminal 111 of one battery unit 100 and the second electrode terminal 112 of an adjacent battery unit 100.

The first battery module group 201 including the first battery module 204 and the second battery module 205 arranged in the first layer may include a plurality of the battery units 100 that are electrically connected to one another via the bus bar 220. Accordingly, the first battery module group 201 may form a first loop in a horizontal direction.

The second battery module group 202 including the third battery module 206 and the third battery module 207 arranged in the second layer may include a plurality of battery units 100 that are electrically connected to one another via the bus bar 220. Accordingly, the second battery module group 202 may form a second loop in a horizontal direction.

The third battery module group 203 including the fifth battery module 208 and the sixth battery module 209 arranged in the third layer may include a plurality of battery units 100 that are electrically connected to one another via the bus bar 220. Accordingly, the third battery module group 203 may form a third loop in a horizontal direction.

For example, as illustrated in FIGS. 3 and 4, the first electrode terminal 111 of one pair of battery units 100 of the second battery module 205 arranged in the first layer may be electrically connected to the second electrode terminal 112 of one pair of battery units 100 of the fourth battery module 207 arranged in the second layer via a first connection member 410. The first electrode terminal 111 and the second electrode terminal 112 may be arranged in a center portion of the second battery module 205 and in a center portion of the fourth battery module 207, respectively.

As further illustrated in FIGS. 3 and 4, the first electrode terminal 111 of the one pair of battery units 100 of the fourth battery module 207 arranged in the second layer may be electrically connected to the second electrode terminal 112 of one pair of battery units 100 of the sixth battery module 209 arranged in the third layer via a second connection member 420.

Furthermore, as illustrated in FIGS. 3 and 4, the second electrode terminal 112 of the one pair of battery units 100 of the second battery module 205 arranged in the first layer may be connected to the first connection member 410, thereby fouling a first external output terminal. The first electrode terminal 111 of the one pair of battery units 110 of the sixth battery module 209 arranged in the third layer may be connected to a third connection member 430, thereby forming a second external output terminal.

Figure 5:
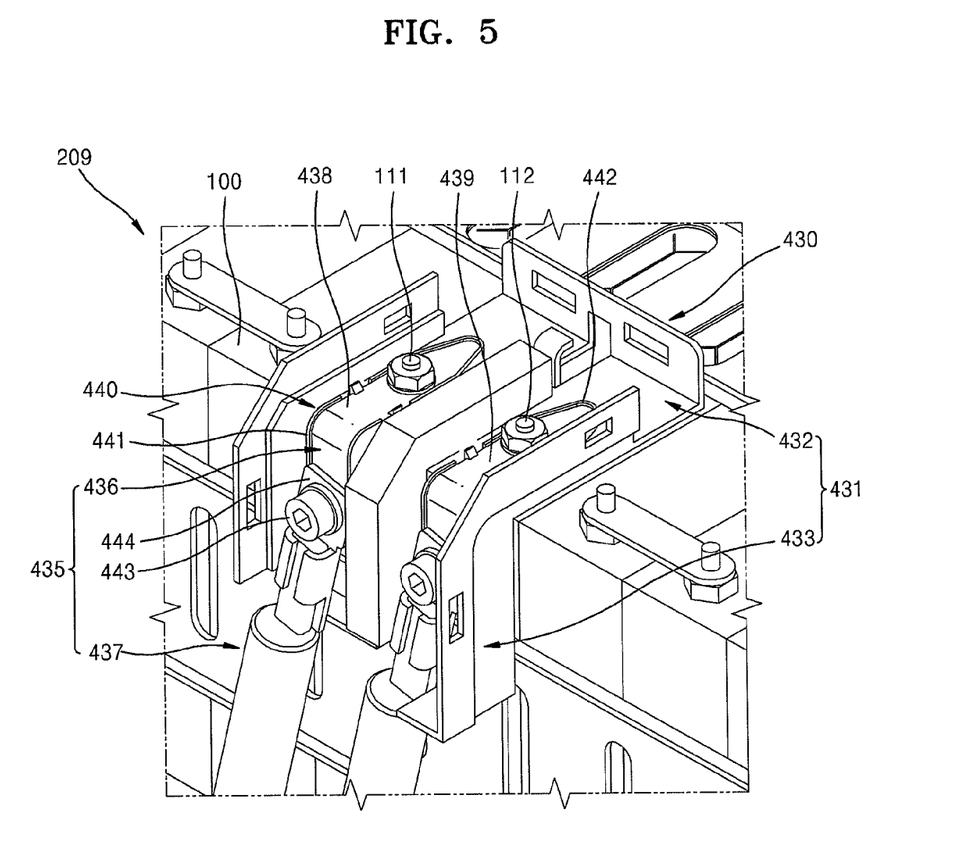
FIG. 5 illustrates an enlarged partial perspective view of a portion of a connection member of the battery pack of FIG. 3.

FIG. 5 illustrates an enlarged perspective view of the connection member 430 according to an embodiment. Here, though only the third connection member 430 is described, the first connection member 410 and the second connection member 420 have substantially the same configurations.

As illustrated in FIG. 3, the sixth battery module 209 may include a plurality of the battery units 100 continuously stacked along the Y-axis. The third connection member 430 may be installed at the one pair of the battery units 100 of the sixth battery module 209.

As illustrated in FIG. 5, the third connection member 430 may include a block portion 431 that covers the one pair of battery units 100, and a connection end 435 on the block portion 431 and electrically connected to the electrode terminals of the one pair of battery units 100. The block portion 431 may preferably be formed of an insulation material, e.g., a polymer resin.

The block portion 431 may include a first portion 432 disposed on an upper surface of the one pair of battery units 100 and a second portion 433 that is extended to a side surface of the one pair of battery units 100 from the first portion 432. The second portion 433 may be formed as a single unit with the first portion 432, i.e., integral therewith. The first portion 432 and the second portion 433 may be curved at about 90° from each other, so as to cover the upper and side surfaces of the one pair of battery units 100.

The connection end 435 may be electrically connected to both the first electrode terminal 111 and the second electrode terminal 112 of the one pair of battery units 100. The connection end 435 may include a connection bar 436 and a wire 437 electrically connected to the connection bar 436.

The connection bar 436 may include a first connection bar 438 electrically connected to the first electrode terminal 111 and a second connection bar 439 electrically connected to the second electrode terminal 112. The connection bar 436 is a conductive plate.

The first connection bar 438 and the second connection bar 439 correspond to the curved form of the block portion 431 and are each curved at about 90° so as to cover the upper and side surfaces of the one pair of battery units 100. For example, as illustrated in FIG. 5, the first connection bar 438 and the second connection bar 439 may be curved along the upper surface of the one pair of battery units 100 of the sixth battery module 209 to the side surface of the one pair of battery units 100 arranged in the third layer toward the fourth battery module 207 arranged in the second layer.

The first connection bar 438 and the second connection bar 439 may be mounted on a mounting portion 440 of the block portion 431. The mounting portion 440 may include a first mounting portion 441 accommodating the first connection bar 438 and a second mounting portion 442 accommodating the second connection bar 439. The first mounting portion 441 may protrude from a surface of the block portion 431, and may be curved along two side boundary portions of the first connection bar 438 from the first portion 432 to the second portion 433 of the block portion 431 to accommodate the first connection bar 438 in a curved inner space. The second mounting portion 442 may have a substantially similar structure to that of the first mounting portion 441, and may accommodate the second connection bar 439 in a curved inner space.

A coupling hole (not shown) may be formed in the first portion 432, and an end portion of the first electrode terminal 111 and an end portion of the second electrode terminal 112 of the one pair of battery units 110 may be exposed outside through the coupling hole.

A first end portion of the first connection bar 438 may be electrically connected to the first electrode terminal 111, and a first end portion of the second connection bar 439 may be electrically connected to the second electrode terminal 112. According to the current embodiment, the first connection bar 438 and the second connection bar 439 may be respectively coupled to the first electrode terminal 111 and the second electrode terminal 112 via bolt-coupling, but may also be coupled via, e.g., laser bonding, welding, rivet-coupling, or screw-coupling.

The wire 437 may be connected to a second end portion of the second connection bar 439. A coupling portion 443 may protrude from the second portion 433 of the block portion 431, and the second end portion of the second connection bar 439 may be coupled to the coupling portion 443, e.g., so the second end portion of the second connection bar 439 may be coupled to the wire 437 via the coupling portion 443. The coupling portion 443 may be bolt-shaped but is not limited thereto.

A first terminal ring 444 may be installed at a first end of the wire 437 and coupled to the second end portion of the second connection bar 439 to electrically connect the wire 437 to the second connection bar 439. As will be described later, a second terminal ring 445 (see FIG. 4) may be installed at a second end of the wire 437 and may be connected to the first electrode terminal 111 of one battery unit 100 arranged in another layer.

Meanwhile, the coupling portion 443 may preferably be formed at the second portion 433 by using an insert injection molding method when forming the block portion 431 by injection molding.

Alternatively, the connection end 435 may include a wireless connection bar, and a first end of the connection bar may be electrically connected to an electrode terminal of a battery unit of a battery module arranged in a layer, and a second end of the connection bar may be electrically connected to another electrode terminal of a battery unit of a battery module arranged in another layer. As described above, as long as electrode terminals of battery modules having different polarities arranged in different layers are electrically connected to one another, the connection member 430 is not limited.

Hereinafter, the battery pack 300 completed by electrically connecting the battery modules 200 arranged in different layers by using the connection member 400 including the third connection member 430, as described above, will be described with reference to FIGS. 3 through 5.

In the first layer, the first battery module group 201 including the first battery module 204 and the second battery module 205 adjacent to the first battery module 204, each of which includes a plurality of battery units 100 stacked, may be arranged. In the second layer above the first battery module 201, the second battery module group 202 including the third battery module 206 and the fourth battery module 207 adjacent to the third battery module 206, each of which includes a plurality of battery units 100 stacked, may be arranged. In the third layer above the second battery module group 202, the third battery module 203 including the fifth battery module 208 and the sixth battery module 209 adjacent to the fifth battery module 208, each of which includes a plurality of battery units 100 stacked, may be arranged.

Battery modules within each battery module group, i.e., within each layer, may be electrically connected to each other via the bus bar 220. That is, the first battery module 204 and the second battery module 205 arranged in the first layer, the third battery module 206 and the fourth battery module 207 arranged in the second layer, and/or the fifth battery module 208 and the sixth battery module 209 arranged in the third layer may be respectively electrically connected to each other via the bus bar 220.

Accordingly, the first battery module group 201 including the first battery module 204 and the second battery module 205, i.e., adjacent to the first battery module 204 and arranged in the first layer, may form a first electrical loop. The second battery module group 202 including the third battery module 206 and the fourth battery module 207, i.e., adjacent to the third battery module 206 and arranged in the second layer, may form a second electrical loop. The third battery module group 203 including the fifth battery module 208 and the sixth battery module 209, i.e., adjacent to the fifth battery module 208 and arranged in the third layer, may form a third electrical loop.

Here, the first electrode terminal 111 and the second electrode terminal 112 of the plurality of battery units 100 may be alternately arranged in a same layer, e.g., in the X-axis and in the Y-axis, so as to cross one another in the same layer. Further, the first electrode terminal 111 and the second electrode terminal 112 of the plurality of battery units 100 may be vertically arranged on the same positions in different layers, e.g., the first electrode terminals 111 may be aligned along the Z-axis. Alternatively, the first electrode terminal 111 and the second electrode terminal 112 of the plurality of battery units 100 may also be alternately arranged to cross one another in different layers.

Next, the first end portion of the second connection bar 439 of the third connection member 430 may be coupled to the second electrode terminal 112 of the one pair of battery units 100 of the sixth battery module 209. The first terminal ring 444 formed at the first end of the wire 437 may be connected to the second end portion of the second connection bar 439 by coupling the first terminal ring 444 to the coupling portion 443 protruding from the second portion 433 of the block portion 431. Therefore, the wire 437 may be electrically connected to the second connection bar 439.

Next, the second terminal ring 445 formed at the second end of the wire 437 may be coupled to a first connection bar 428 of the second connection member 420, which is electrically connected to the first electrode terminal 111 of the one pair of battery units 100 of the fourth battery module 207. Therefore, the wire 437 may be electrically connected to the first connection bar 428 of the second connection member 420.

Meanwhile, a first end portion of the first connection bar 428 of the second connection member 420 may be electrically connected to an end portion of the first electrode terminal 111 of the one pair of battery units 100 of the fourth battery module 207. Accordingly, the first electrode terminal 111 of the second battery module group 202 arranged in the second layer may be electrically connected to the second electrode terminal 112 of the third battery module group 203 arranged in the third layer via the wire 437.

The second electrode terminal 112 arranged in the third layer and the first electrode terminal 111 arranged in the second layer adjacent thereto are not arranged in the same positions vertically so as to be electrically connected to each other in a diagonal direction via the wire 437.

Next, a first end portion of the second connection bar 429 of the second connection member 420 may be coupled to the second electrode terminal 112 of the one pair of battery units 100 of the fourth battery module 207. The first terminal ring 444 formed at a first end of the wire 437 may be located at a second end portion of the second connection bar 429 so as to be coupled to the coupling portion 443, thereby electrically connecting the wire 437 to the second connection bar 429.

Next, the second terminal ring 445 formed at the second end of the wire 437 may be coupled to the first connection bar 418 of the first connection member 410 electrically connected to the first electrode terminal 111 of the one pair of battery units 100 of the second battery module 205. Therefore, the wire 437 may be electrically connected to the first connection bar 418 of the first connection member 410.

Meanwhile, an end portion of the first connection bar 418 of the first connection member 410 may be electrically connected to an end portion of the first electrode terminal 111 of the one pair of battery units 100 of the second battery module 205. Accordingly, the second electrode terminal 112 of the second battery module group 202 arranged in the second layer may be electrically connected to the first electrode terminal 111 of the first battery module group 201 arranged in the first layer via the wire 437 in a diagonal direction.

Meanwhile, a second connection bar 419 of the first connection member 410 may be coupled to the second electrode terminal 112 of the one pair of battery units 110 of the second battery module 205, and the wire 437 may be electrically connected to the second connection bar 419 of the first connection member 410. A second terminal ring 445 may be installed at the second end of the wire 437 to be connected to an external connector, i.e., to define a first output terminal.

The first connection bar 438 of the third connection member 430 may be coupled to the first electrode terminal 111 of the one pair of battery units 110 of the sixth battery module 209, and the wire 437 may be electrically coupled to the first connection bar 438 of the third connection member 430. The second terminal ring 445 installed at the second end of the wire 437 may be connected to an external connector, thereby forming a second output terminal.

As described above, in the battery pack 300, the first battery module group 201, the second battery module group 202, and the third battery module group 203 may form loops via the bus bar 220. Further, the first battery module group 201, the second battery module group 202, and the third battery module group 203 may be arranged in different vertical layers to be electrically connected to one another via the connection member 400, i.e., the first connection member 410, the second connection member 420, and the third connection member 430. Accordingly, the plurality of battery units 100 stacked in horizontal and vertical directions may be electrically connected to one another.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a plurality of battery modules, each battery module including a plurality of battery units with positive and negative electrode terminals, and each battery unit including a plurality of battery cells;
   a plurality of bus bars connecting positive electrode terminals to negative electrode terminals of adjacent battery units, battery modules adjacent to each other in a horizontal direction being electrically connected to each other via the bus bar to form a loop; and
   a connection member electrically connecting battery modules adjacent to each other in a vertical direction, the connection member including at least one connection bar in contact with two different surfaces of a same battery unit,
   wherein the connection bar of the connection member is in contact with two different adjacent surfaces of the same battery unit.

2. The battery pack as claimed in claim 1, wherein the connection member further comprises:
   a block portion covering at least one battery unit in each horizontal layer of battery modules, each horizontal layer of battery modules including battery modules adjacent to each other along the horizontal direction; and
   a connection end disposed on the block portion and coupled to an electrode terminal of the at least one battery unit, the connection end electrically connecting a first electrode terminal of the at least one battery unit in a first horizontal layer of battery modules to a second electrode terminal of the at least one battery unit in a second horizontal layer of battery modules vertically adjacent to the first horizontal layer of battery modules, the first and second electrode terminals having different polarities.

3. The battery pack as claimed in claim 2, further comprising a mounting portion on the block portion, the connection end being mounted on the mounting portion, and the block portion including a first portion covering an upper surface of the at least one battery unit and a second portion extending to a side surface of the at least one battery unit from the first portion.

4. The battery pack as claimed in claim 3, wherein the block portion includes a polymer resin.

5. The battery pack as claimed in claim 2, wherein the at least one connection bar is a plurality of connection bars, and the connection end includes:
   the plurality of connection bars electrically connected to electrode terminals of the battery units, a first end of each of the connection bars being connected to a first electrode terminal of least one battery unit in a first battery module; and
   a plurality of wires electrically connected to the connection bars, each wire including:
      a first terminal ring electrically connected to a second end of a respective connection bar, and
      a second terminal ring electrically connected to a second electrode terminal of at least one battery unit in a second battery module vertically adjacent to the first battery module.

6. The battery pack as claimed in claim 5, wherein the connection bars extend from an upper surface of the at least one battery unit in the first battery module toward the second battery module along a side surface of the at least one battery unit in the first battery module.

7. The battery pack as claimed in claim 5, wherein:
   a first electrode terminal of at least one battery unit in a vertically uppermost battery module is connected to a first wire via a first connection bar to define a first output terminal, and
   a second electrode terminal of at least one battery unit in a vertically lowermost battery module is connected to a second wire via a second connection bar to define a second output terminal, the first and second electrode terminals having different polarities.

8. The battery pack as claimed in claim 5, further comprising a coupling portion on a portion of the second end of the connection bar, the first terminal ring of the wire being coupled to the coupling portion.

9. The battery pack as claimed in claim 2, wherein the connection end includes the connection bar electrically connected to an electrode terminal of the at least one battery unit, the connection bar extending from an upper surface of the at least one battery unit of a battery module toward a vertically adjacent battery module along a side surface of the at least one battery unit.

10. The battery pack as claimed in claim 9, wherein a first end of the connection bar is coupled to a first electrode terminal of at least one battery unit of a first battery module, and a second end of the connection bar is coupled to a second electrode terminal of at least one battery unit of a second battery module vertically adjacent to the first battery module.

11. The battery pack as claimed in claim 2, wherein first and second electrode terminals of the battery units of the battery modules are vertically arranged in same positions across different layers, and the connection end connects the first electrode terminal of at least one battery unit of the battery modules arranged in a first layer and the second electrode terminal of at least one battery unit of the battery modules arranged in a second layer, in a diagonal direction.

12. The battery pack as claimed in claim 1, wherein the connection member is connected to at least one battery unit in each layer of the battery modules, each layer of the battery modules including a plurality of battery modules adjacent to each other along the horizontal direction.

13. A battery pack, comprising:
- a plurality of battery modules, each battery module including a plurality of battery units with positive and negative electrode terminals, and each battery unit including a plurality of battery cells;
- a plurality of bus bars connecting positive electrode terminals to negative electrode terminals of adjacent battery units, battery modules adjacent to each other in a horizontal direction being electrically connected to each other via the bus bar to form a loop; and
- a connection member electrically connecting battery modules adjacent to each other in a vertical direction,
- wherein the connection member is disposed in a gap between battery modules arranged in a first layer and battery modules arranged in a second layer adjacent to the first layer along the vertical direction, each of the first and second layers including a plurality of battery modules adjacent to each other along the horizontal direction.

14. The battery pack as claimed in claim 1, wherein the battery unit includes a case configured to provide space for the battery cells, the positive and negative electrode terminals being connected to the battery cells and protruding out of the case.

15. The battery pack as claimed in claim 1, further comprising a pair of end plates on outermost portions of each battery module, the pair of end plates being coupled to each other via a guide plate.

16. The battery pack as claimed in claim 15, further comprising a coupling hole in each of the end plates, end plates of battery modules adjacent to each other along the vertical direction being coupled to each other via a fastener through the coupling hole.

17. The battery pack as claimed in claim 1, wherein the at least one connection bar of the connection member extends from an upper surface of at least one battery unit in a first battery module toward a second battery module along a side surface of the at least one battery unit in the first battery module.

18. The battery pack as claimed in claim 1, wherein the at least one connection bar of the connection member is connected to an electrode terminal of at least one battery unit and is L-shaped.

19. The battery pack as claimed in claim 1, wherein the connection bar of the connection member is in direct contact with two perpendicular surfaces of the same battery unit.

* * * * *